(12) United States Patent
Froemel (10) Patent No.: US 9,787,132 B2
(45) Date of Patent: Oct. 10, 2017

(54) AUXILIARY POWER INPUT SWITCH CONFIGURED TO SWITCH BETWEEN LINE POWER AND AUXILIARY POWER IN AN EMERGENCY

(71) Applicant: Ulrich Froemel, Smithtown, NY (US)

(72) Inventor: Ulrich Froemel, Smithtown, NY (US)

( * ) Notice: Subject to any disclaimer, the term of this patent is extended or adjusted under 35 U.S.C. 154(b) by 347 days.

(21) Appl. No.: 14/664,881

(22) Filed: Mar. 22, 2015

(65) Prior Publication Data

US 2016/0276869 A1  Sep. 22, 2016

(51) Int. Cl.
*H02J 9/04* (2006.01)
*F24D 19/10* (2006.01)
*H01R 13/713* (2006.01)
*H01R 24/70* (2011.01)
*H01R 105/00* (2006.01)

(52) U.S. Cl.
CPC ............... *H02J 9/04* (2013.01); *F24D 19/10* (2013.01); *H01R 13/713* (2013.01); *H01R 24/70* (2013.01); *H01R 2105/00* (2013.01)

(58) Field of Classification Search
CPC ......... H02J 9/04; H01R 24/70; H01R 13/713; H01R 2105/00; F24D 19/10
USPC .......................................................... 307/139
See application file for complete search history.

(56) References Cited

U.S. PATENT DOCUMENTS

| | | | | |
|---|---|---|---|---|
| 3,649,943 A * | 3/1972 | Matto | ................. | H01R 13/713 337/380 |
| 4,164,701 A * | 8/1979 | Gulledge | ............... | G01R 31/02 324/508 |
| 4,369,692 A * | 1/1983 | Kemeny | ................. | F41B 6/006 124/3 |
| 4,995,017 A * | 2/1991 | Sellati | ................ | H01R 13/7038 307/125 |
| 6,121,897 A * | 9/2000 | Flegel | ..................... | G08G 1/095 340/693.2 |
| 7,015,404 B2 * | 3/2006 | Sodemann | ................ | H02J 3/38 200/51 R |
| 7,471,505 B2 * | 12/2008 | Gull | ......................... | H02J 3/38 200/43.16 |
| 7,554,034 B2 * | 6/2009 | Smith | ................ | H01R 13/5213 174/135 |
| 8,563,883 B1 * | 10/2013 | Flegel | ..................... | H02B 1/48 200/50.02 |
| 2007/0121260 A1 * | 5/2007 | Sullivan | ................. | H01H 83/04 361/42 |
| 2014/0183977 A1 * | 7/2014 | Braunstein | ............... | H02G 3/00 307/147 |

(Continued)

*Primary Examiner* — Jared Fureman
*Assistant Examiner* — Michael Warmflash
(74) *Attorney, Agent, or Firm* — John F. Vodopia (57) ABSTRACT

A auxiliary power (AP) input switch includes at least a line power-in terminal, a switched power out terminal, an AC power entry receptacle and a switch actuating element that is switched to an on state to make a connection between the line power-in terminal and the switched power-out terminal, and is switched to an off state to break the connection between line power-in terminal and the switched power-out terminal and to make a connection between the AC power entry receptacle and to the switched power-out terminal. The auxiliary power (AP) input switch that is used as or to replace an emergency cut-off switch for an electrically-driven system, such as a heating system, air conditioning system, refrigeration system, etc., without limitation.

14 Claims, 5 Drawing Sheets

(56) References Cited

U.S. PATENT DOCUMENTS

2015/0001937 A1* 1/2015 Wang ............... H01R 13/70
307/52

* cited by examiner

AUXILIARY POWER INPUT SWITCH CONFIGURED TO SWITCH BETWEEN LINE POWER AND AUXILIARY POWER IN AN EMERGENCY

BACKGROUND OF THE INVENTION

The invention relates to an auxiliary power (AP) input switch that is used as or to replace an emergency cut-off switch for an electrically-driven system, such as a heating system, air conditioning system, refrigeration system, etc., without limitation.

During hurricanes and other severe whether conditions, local power delivery from the electrical grid is sometimes interrupted. Such interruptions can be for as little as several seconds to as long as several weeks. Where an interruption extends for more than a few hours, for example, for a day or more, the consequences of such power outages become apparent relatively quickly to the common homeowner. In particular, most of the household appliances and services available in the modern home that we all take for granted are electrically powered and are gone in the instant electrical power ceases flowing into our homes from the grid to power same. For example, as soon as power to the home is interrupted, the home loses lights, television, cable, radio, refrigerator power, air conditioners (to name a few) and in some cases our heat and hot water if electrically powered.

Some electrical appliances can be powered auxiliary using batteries or a gas or diesel-powered electrical generator, if available. But one of the most critical of these appliances for one's daily needs, particularly under extreme weather conditions that might have been the cause of the power failure to begin with, is the heating and hot water system.

Not only is being without heat and hot water uncomfortable, but in the event that a home remains without electrical power for two or more days, and the outside environment remains below freezing, catastrophic failures can occur inside the home. Most notably, the water lines and the hydronic heating and cooling system lines can and will freeze without an external heating source, resulting in costly repairs and sometimes secondary damages like flooding. To avoid such damages, costs in repairs and the concomitant discomfort of living in freezing or near freezing temperatures, the internal heating system must be restored.

In the case that the grid is unable to supply power, emergency electrically generators may be relied upon to provide a source of electrical power to electrical systems. For example, a refrigerator of air conditioner may be "plugged" or electrically connected through the respective system's power cord to an electrical generator. For that matter, a power cord from the electrical generator can be "jumped" or temporarily electrically connected to the electrical appliances or systems, for example, bypassing an electrical heating system cutoff switch. Problems can arise with such a temporary fix, however. For example, doing so is dangerous and must be carried out in every emergency. Also, the connections could always come undone, or may need to be undone to move the generator. Perhaps as importantly, doing so foregoes the emergency cutoff switch function, as it is bypassed.

It is possible to provide an automatic transfer switch that might be switched to transfer the load at a building or home's electrical panel from the grid or utility power to an auxiliary source of electrical power, such as a generator, but is typically done in new constructions. For that matter, even if an automatic transfer switch were wired into a building or homes electrical system, same also would require a permanent generator sufficient to power the entire load, not merely the load associated with one system, such as a heating system. Put another way, automatic transfer switch have the shortcoming that they are not intended for use with a specific system. And like automatic transfer switches, other switches are known, for example, combination switch/receptacles, such as the T5225 by Leviton Manufacturing Co. Inc., but such known switches are used for switch and availability of delivered electrical power, not for receiving and delivering auxiliary electrical power, and switching.

SUMMARY OF THE INVENTION

The present invention overcomes the shortcomings of known arts.

To that end, the invention provides an auxiliary power (AP) input switch that is installed in the line powering an system or appliance in a commercial or residential building, such as a replacement or substitution for an emergency cut-off switch for heating system (as one example), and operates to enable a user to switch off the line power in at the time of an electrical power interruption, concurrently switch an auxiliary power line into the power out line to the system (to be electrically powered in an emergency with an alternative source of electrical power).

The AP input switch is preferably no larger than a standard residential electrical power outlet or switch and is configured with an AC power entry module with male prongs, blades or pins for receiving an auxiliary source of AC power. A power cable with a male connector for connecting to an auxiliary power source (like an electrical or diesel generator) on one end of the power cable and a female connecter on the other end for connects the cable to the AC power entry module of the AP input switch. Preferably, the power cable includes an in-line ground fault circuit interrupt (GFCI) module.

The auxiliary power (AP) input switch can be used to replace or operate as an emergency switch for any electrically powered, electrically wired system, to provide a receptacle and switch auxiliary electrical power to the specific system, such as heating system.

In an embodiment, the invention provides an auxiliary power (AP) input switch with a line power-in terminal, a switched power-out terminal, an AC power entry receptacle and a switch that is switched to an on state to make a connection between the line power-in terminal and the switched power-out terminal, and is switched to an off state to break the connection between line power-in terminal and the switched power-out terminal and to make a connection between the AC power entry receptacle and to the switched power-out terminal.

In an embodiment, the invention provides a system for providing auxiliary power to a specific electrical system (such as a heating system that is electrically wired to an electrical supply box in a home or commercial building) in case an electrical power failure. The system includes a power cable including a male power plug connector at one end for electrically connecting the power cable to an auxiliary mains power supply and a female power plug connector at another end and an in-line ground fault circuit interrupt (GFCI) module electrically connected to the power cable between the male power plug connector and the female power plug connector and an auxiliary power (AP) input switch.

The auxiliary power (AP) input switch comprises a line power-in terminal, a switched power-out terminal wired to the heating system, an AC power entry receptacle for receiving the female power plug connector of the power cable and a switch actuating element that is switched to an on state to make a connection between the line power-in terminal and the switched power-out terminal, and is switched to an off state to break the connection between line power-in terminal and the switched power-out terminal and to make a connection between the AC power entry receptacle and to the switched power-out terminal. The auxiliary power (AP) input switch may be a used as a replacement for a power cutoff switch to the electrical system, or as power cutoff switch in the first instance. The system for providing auxiliary power to the electrically powered system is ideal for replacing a power cutoff switch in a residential home heating system. For that matter, system for providing auxiliary power to electrically powered system preferably has a neutral terminal, wherein the neutral terminal is electrically connected to the electrically powered system.

BRIEF DESCRIPTION OF THE DRAWINGS

Further features and advantages of the invention will become apparent from the description of embodiments that follows, with reference to the attached figures, wherein.

DETAILED DESCRIPTION OF THE PREFERRED EMBODIMENTS

The following is a detailed description of example embodiments of the invention depicted in the accompanying drawing. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

This invention provides an auxiliary power (AP) input switch and system for providing auxiliary power to a home or commercial building's electrically driven or controlled system in case an electrical power failure that utilizes the auxiliary power (AP) input switch and a power cable for connecting an auxiliary power source to the home or commercial building's electrically driven or controlled and configured with a ground fault circuit interrupter (GFCI) to protect the auxiliary power source in a case where grid line-in power is restored during system operation.

In an embodiment, the invention provides an auxiliary power (AP) input switch 10, as depicted in FIGS. 1A, 1B, 2A, 2B and 2C. The auxiliary power (AP) input switch may be used to provide for switching from power grid in a case of emergency, to a source or auxiliary power. In one exemplary embodiment, the auxiliary power (AP) input switch is wired to replace an emergency shut-off switch to a home or commercial building's heating system. The exemplary embodiment is intended to show one use of the invention, and is not meant to limit the scope of the invention in any way.

The auxiliary power (AP) input switch includes an AC power entry receptacle 40 and a switch actuator assembly 60 that is switched to an on state to make an electrical connection between a line power-in terminal 20 (and terminal screw 20') for connection to line power 22 from the electrical grid) and a switched power-out terminal 30 (and terminal screw 30'), for connection to a system to be auxiliary electrically powered, e.g., a heating system, during intended operation, e.g., a heating system (for example, via line or wire 32). The switch actuator assembly 60 is switched to an off state to disconnect the line power input terminal 20 from the switched power-out terminal 30 and to connect the AC power entry receptacle (contacts) to the switched power-out terminal 30, using a switch actuating member 62. The switch actuating element 62 is preferably plastic.

The AC power entry receptacle 40 is configured as a male receptacle, which comprises male prongs, blades or pins. For example, male prong 42 connects to the power source in a plug in an auxiliary power cable (to be described in detail below), male prong 44 connects to neutral and male prong 46 connects to ground. The AC power entry receptacle 40, the switch actuator assembly 60, etc., are enclosed with a housing 12 that is fixedly attached or mounted via upper 14 and lower 16 attachment tabs with openings 18 through which fastening means (not shown) are passed. The housing 12 is preferably configured so that the auxiliary power (AP) input switch not larger in size that a standard electrical outlet or switch.

The auxiliary power (AP) input switch 10 further comprises an auxilliary power out terminal 26 (and terminal screw 26'), to which an auxilliary output line or wire 28 is connected for tapping the auxially power when an auxilliary power cable is present in the AC power entry receptacle 40 and the switch actuating element 62 is thrown to the off position. The auxilliary power out terminal 26 is in an open circuit state without a female plug connector of an auxilliary power cable (see below) inserted into the AC power receptacle 40. Also included is an auxilliary neutral terminal 36 (and terminal screw 36'), to which is connected and auxilliary neutral line or wire 38. A neutral jumper wire should be connected from the auxilliary neutral terminal 36 at the system to be auxilliarilly electrically powered, e.g., a heating system (during intended operation).

The AC power receptacle 40 has a plastic body 48 for electrical isolation and that formed a recessed cavity for receiving a female plug of the auxiliary power cable (see below). The male power prong 42 extends to a conducting element 43, either integrally formed with or physically connected thereto. Preferably, the conducting element 43 is formed of the same electrically conducting metal of the male power prong 42 (e.g., brass, brass alloy or copper). The conducting element 43 includes an electrical contact 45 outside the plastic body 48 and opposite a contact 47 affixed to or integral with a (first) tension actuator 49 (which is preferably copper) that electrically connects the male power plug 42 AC power receptacle 40 to the auxiliary power out terminal 26 when a female plug connector (see below) is present in the AC power receptacle. A bumper 50 comprising a non-conductive material such as TEFLON™ is affixed to the tension actuator 49 that is physically moved by the insertion of the female plug connector, making an electrical connection between the contact 45 that is electrically part of male prong 42 and electrical contact 47 that is electrically part of tension actuator 49.

Figure 1A:
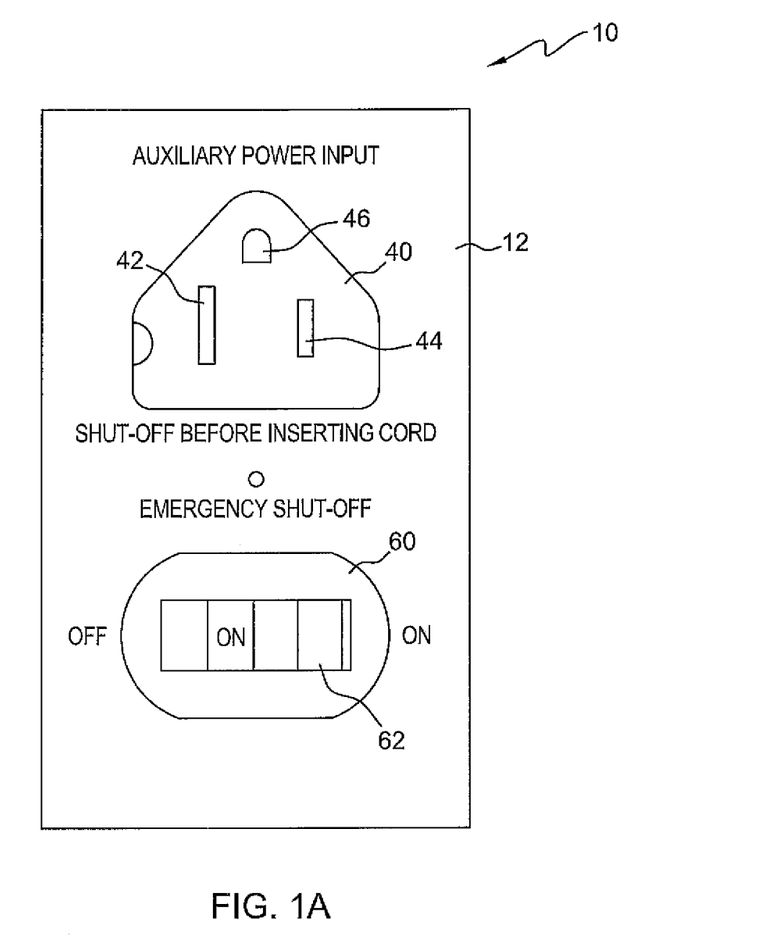
FIG. 1A represents an embodiment of an auxiliary power input switch of the invention.
Figure 1B:
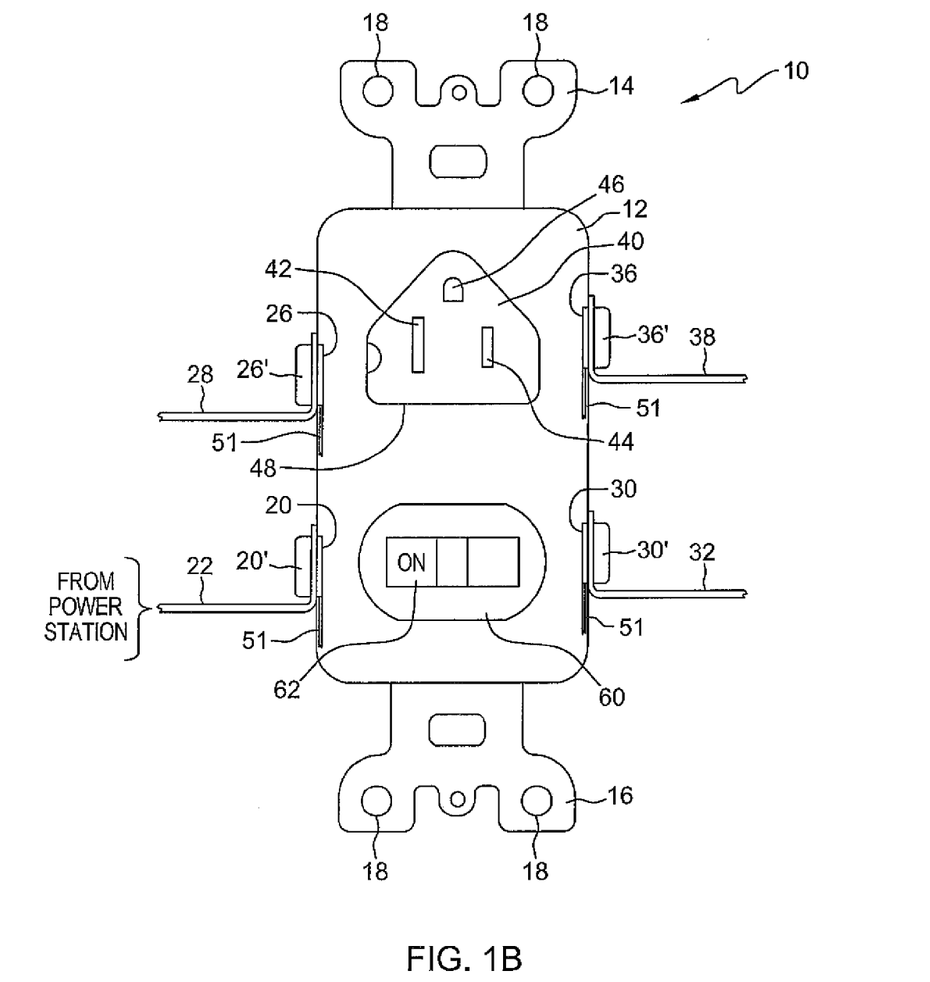
FIG. 1B is a schematic diagram of the FIG. 1 embodiment, highlighting a wiring arrangement for intended use.
Figure 2A:
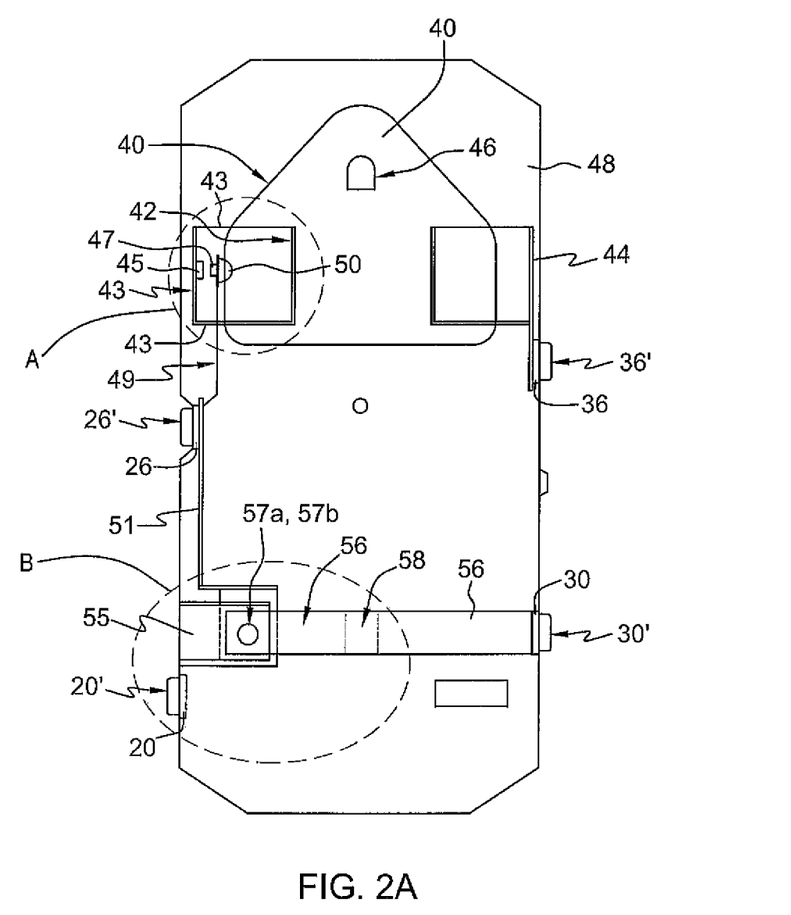
FIG. 2A is a schematic diagram of the FIG. 1 embodiment, highlighting an inner configuration of the auxiliary power input switch of the invention.
Figure 2B:
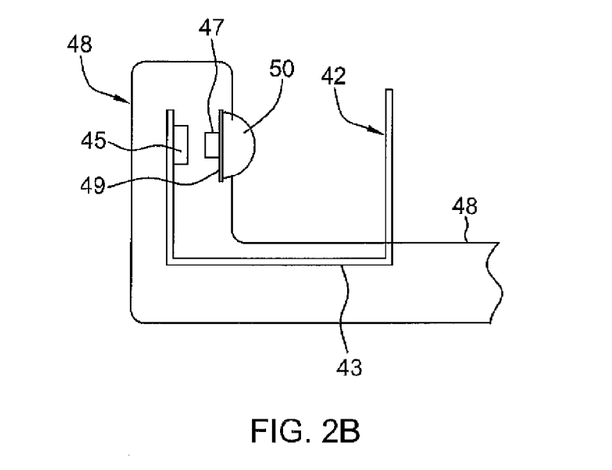
FIG. 2B is an expanded schematic depiction of a side cross-section view of a portion of the auxiliary power input receptacle, identified as encircled area "A" in FIG. 2A.
Figure 2C:
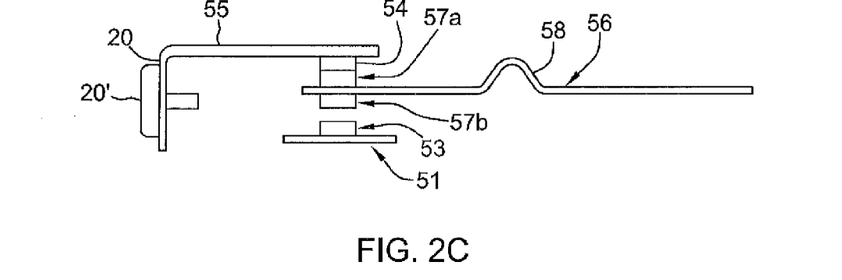
FIG. 2C is an expanded schematic depiction of a side cross-section view of a portion of the line-in switching configuration, identified as encircled area "B" in FIG. 2A.

FIG. 2A depicts the auxiliary power (AP) input switch 10 in further detail, where FIGS. 2B and 2C present expanded side cross-sectional views of portions "A" and "B" of FIG. 2A, respectively, in greater detail.

As shown, an auxiliary power bar 51 extends from the auxiliary power out terminal 26 to a position proximate the line power-in terminal 20 and line power-in bar 55. The auxiliary power bar 51 includes an electrical contact 53 as shown. An electrical contact 54 is physically and electrically connected to a line power-in bar 55, electrically and physically connected to or integral with the terminal 20. A (second) tension actuator 56 (preferably copper) includes double sided electrical contacts 57a, 57b, as shown. The (second) tension actuator 56 is electrically and physically connected to the switched power-out terminal 30. A cam bend 58 in the (second) copper tension actuator 56 is acted upon by the physical switching of the switch actuating element 62, which in the on state cause contact 54 to make an electrical connection with contact 57a of the (second) tension actuator 56, providing grid power to the heating system. When switched to an off state, the switch actuating element 62 causes contact 53 of auxiliary power bar 51 to make an electrical connection with contact 57b of the (second) tension actuator 56, thereby connecting power from the auxiliary power cable plug (see below) inserted into the AC power entry receptacle 40 (compelling the bumper 50 to move, which movement then makes the connection between the male prong 42 and (first) tension actuator 49 (which also is preferably copper for conductivity and flexibility).

As such, the auxiliary power (AP) input switch may be configured as an emergency heating system cut-off switch or as a replacement for an existing emergency heating system cut-off switch, in an embodiment.

Figure 3:
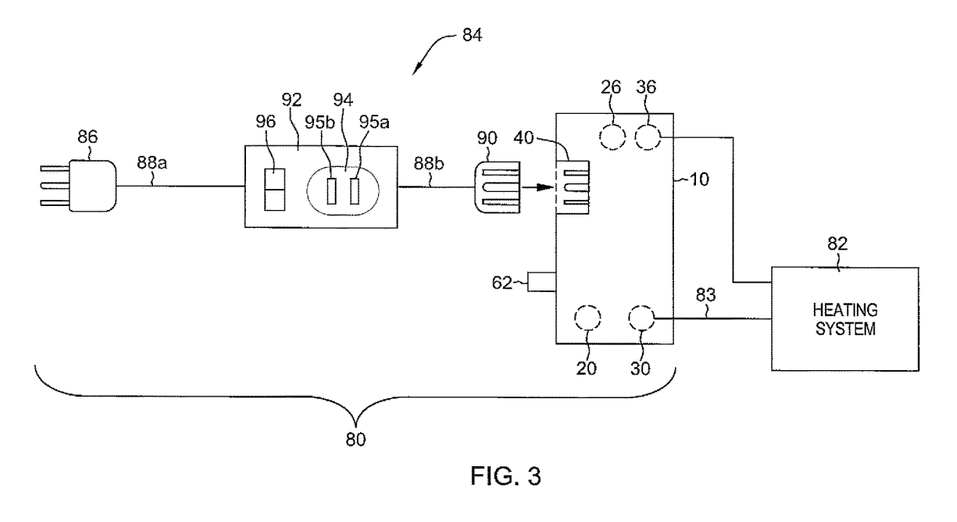
FIG. 3 is a schematic representation of a system for providing auxiliary power to a heating system, constructed according to the invention.

In an embodiment, the invention provides a system 80 for providing auxiliary power to a heating system 82 in case an electrical power failure, now described with reference to FIG. 3. The system 80 includes a power cable 84 with a male power plug connector 86 at one end of an electrical wire 88a for electrically connecting the power cable to an auxiliary mains power supply (not shown) and a female power plug connector 90 at one end of an electrical wire 88b for connecting the power cable 84 to the AC power receptacle 40 of the auxiliary power (AP) input switch 10, electrically connected by wire 83 to the heating system 82 (the heating system line power in). The auxiliary neutral terminal 36 also must be wired to the heating system 82 (the heating system neutral). A ground fault circuit interrupter (GFCI) is connected to opposing ends of wires 88a and 88b as shown GFCI 92 includes a GFCI module 94, with set and reset buttons 95a, 95b, and an on/off switch 96.

As described above, the auxiliary power (AP) input switch 10 comprises a line power-in terminal 20, a switched power out terminal 30, an AC power entry receptacle 40 for receiving the female power plug connector 90 of the power cable 84 and the switch actuating element 62 that is switched to an on state to connect the line power-in terminal and switched power out terminal and is switched to an off state to disconnect the line power input terminal from the switched power-out terminal and to connect the AC power entry receptacle and to the switched power-out terminal.

As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. An auxiliary power (AP) input switch, comprising:
a line power-in terminal;
an auxiliary power-out terminal;
a switched power-out terminal;
an AC power entry receptacle configured as a male receptacle that includes an actuator; and
a switch that is switchable between an on-switch state and an off-switch state,
wherein in the on-switch state, the line power-in terminal is electrically connected to the switched power-out terminal, and the auxiliary power-out terminal is in an open-circuit state;
wherein in the off-switch state, and upon a condition in which a female auxiliary power supply plug connector is present in and electrically connected to the positive prong of the AC power entry receptacle, the switch electrically disconnects the line power-in terminal from the switched power-out terminal and wherein the actuator operates to effect electrical connections between the positive prong of the AC power entry receptacle, the auxiliary power-out terminal and the switched power-out terminal; and
wherein the actuator includes a non-conductive button that is physically moved by insertion of the female auxiliary power supply plug connector to the AC power receptacle to effect the electrical connections.

2. The auxiliary power (AP) input switch as set forth in claim 1, wherein the male receptacle comprises male prongs, blades or pins.

3. The auxiliary power (AP) input switch as set forth in claim 1, further comprising a switch housing.

4. The auxiliary power (AP) input switch as set forth in claim 1, wherein the housing is configured so that the auxiliary power (AP) input switch is not larger in size than a residential electrical outlet or switch.

5. The auxiliary power (AP) input switch as set forth in claim 1, further comprising a neutral terminal.

6. The auxiliary power (AP) input switch as set forth in claim 1, wherein the button is made of polytetrafluoroethylene configured as an emergency heating system cut-off switch.

7. The auxiliary power (AP) input switch as set forth in claim 1, configured as an emergency heating system cut-off switch.

8. The auxiliary power (AP) input switch as set forth in claim 1, configured to replace an existing emergency heating system cut-off switch.

9. A system for providing auxiliary power to an electrically powered system in case an electrical power failure, comprising:
a power cable including a male power plug connector at one end for electrically connecting the power cable to an auxiliary mains power supply and a female auxiliary power supply plug connector at another end and an in-line ground fault circuit interrupt (GFCI) module electrically connected to the power cable between the male power plug connector and the female power plug connector; and a system auxiliary power (AP) input switch, comprising:
  a line power-in terminal;
  an auxiliary power-out terminal;
  a switched power-out terminal wired to the electrically powered system;
  an AC power entry receptacle configured with an actuator for receiving the female auxiliary power supply plug connector of the power cable; and
  a switch that when switched to an on state, electrically connects the line power-in terminal to the switched power-out terminal and maintains the auxiliary power-out terminal in an open-circuit state, and when switched to an off state, and upon a condition in which the female auxiliary power supply plug connector is resent in and electrically connected to the positive prong of the AC power entry receptacle, electrically disconnects the line power-in terminal from the switched power-out terminal and wherein the actuator operates to effect electrical connections between the positive prongs of the AC power entry receptacle, the auxiliary power-out terminal and to the switched power-out terminal;
  wherein the actuator includes a non-conductive button that is physically moved by insertion of the female auxiliary power supply plug connector to the AC power receptacle to effect the electrical connections.

10. The system for providing auxiliary power to the electrically powered system as set forth in claim 9, wherein the electrically powered system is a home heating system.

11. The system for providing auxiliary power to the electrically powered system as set forth in claim 9, further comprising a neutral terminal, wherein the neutral terminal is electrically connected to the electrically powered system.

12. A system for providing auxiliary power to a heating system in case an electrical power failure, comprising:
  a power cable including a male power plug connector at one end for electrically connecting the power cable to an auxiliary mains power supply and a female power plug connector at another end and an in-line ground fault circuit interrupt (GFCI) module electrically connected to the power cable between the male power plug connector and the female power plug connector; and a system auxiliary power (AP) input switch, comprising:
    a line power-in terminal;
    an auxiliary power-out terminal;
    a switched power-out terminal wired to the heating system;
    an AC power entry receptacle configured with an actuator and for receiving the female power plug connector of the power cable; and
    a switch actuating element that when switched to an on state, electrically connects the line power-in terminal to the switched power-out terminal and maintains the auxiliary power-out terminal in an open-circuit state, and when switched to an off state, and upon a condition in which the female auxiliary power supply plug connector is present in and electrically connected to the positive prong of the AC power entry receptacle, electrically disconnects the line power-in terminal from the switched power-out terminal and wherein the actuator operates to effect electrical connections between the positive prong of the AC power entry receptacle, the auxiliary power-out terminal and the switched power-out terminal;
    wherein the actuator includes a non-conductive button that is physically moved by insertion of the female auxiliary power supply plug connector to the AC power receptacle to effect the electrical connections.

13. The system for providing auxiliary power to the heating system, as set forth in claim 12, wherein the heating system is a home heating system.

14. The system for providing auxiliary power to the heating system, as set forth in claim 12, further comprising a neutral terminal, wherein the neutral terminal is electrically connected to the heating system.

* * * * *